Oct. 9, 1956 — B. J. AUDETTE — 2,765,553
LICENSE PLATE HOLDER
Filed Sept. 26, 1955
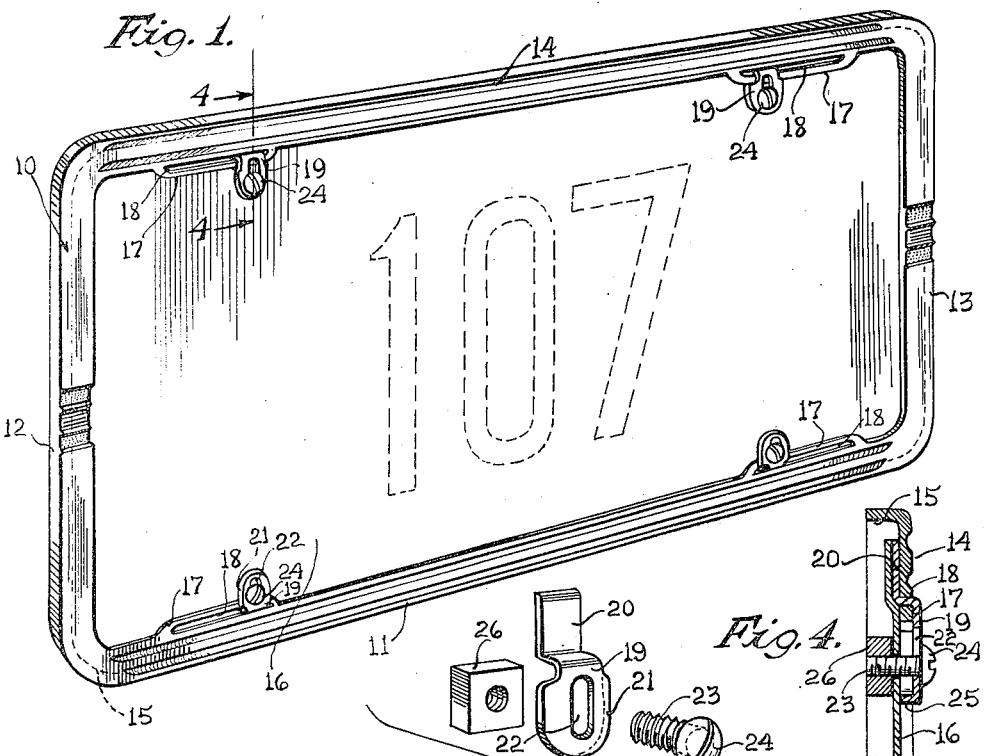
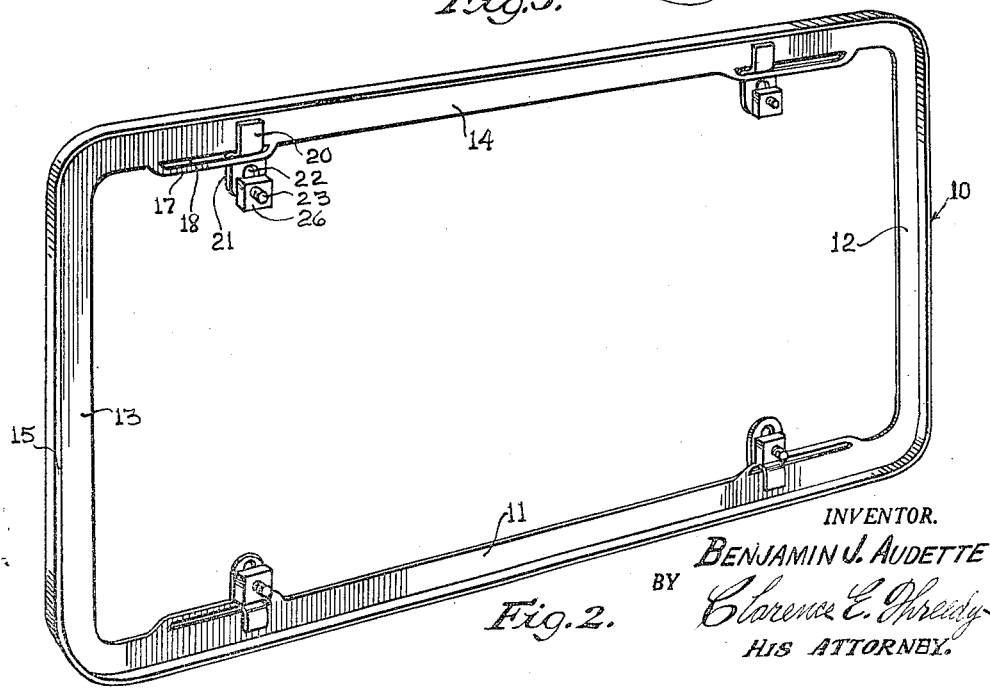
INVENTOR.
BENJAMIN J. AUDETTE
BY Clarence E. Threedy
HIS ATTORNEY.

2,765,553
LICENSE PLATE HOLDER

Benjamin J. Audette, Los Angeles, Calif.

Application September 26, 1955, Serial No. 536,708

2 Claims. (Cl. 40—125)

This invention relates to certain new and useful improvements in a license plate holder and has for its principal object the provision of a comparatively simple, rigid, and permanent structure for supporting license plates.

Another and equally important object of my invention is in the provision in a device of this character whereby license plates of varying lengths and widths may be readily accommodated therein.

Still another and equally important object of this invention is in the provision of simple and efficient means for connecting license plates of various sizes in the holder.

Yet another object is in the provision in a device of this character of a construction which permits vertical and horizontal adjustment of the license plate connecting means.

Another and equally important object of this invention is the provision of an improved construction of this character which will be highly efficient in use and economical in manufacture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of my license plate holder together with a license plate;

Fig. 2 is a rear perspective view of my holder without a license plate mounted therein;

Fig. 3 is an exploded view of the parts that make up my license plate connecting means; and Fig. 4 is a fragmentary detail sectional view taken substantially on line 4—4 of Fig. 1.

Referring more particularly to Fig. 1 of the drawings, it will be seen that the license plate holder of this invention comprises a substantially rectangular frame 10 composed of a bottom longitudinal member 11, end or vertical members 12 and 13, and a top longitudinal member 14.

The members 11, 12, 13, and 14 are preferably formed from a single blank of metal having the peripheral edge thereof bent laterally to form a flange 15 so as to be substantially L-shaped in cross-section. The flange 15 together with the rear side of the members 11, 12, 13, and 14 provide a seat for the peripheral edge of a license plate 16.

The frame members 11 and 14 are also formed to provide ears 17. These ears 17 are in spaced confronting relation with respect to each other as is shown in Figs. 1 and 2. Each of these ears 17 are provided with longitudinal slots 18, with the slots of the ears 17 of the member 11 parallel to the slots of the ears 17 of the member 14.

Into each of these slots 18 projects one end of a bolt support 19. These bolt supports 19 are formed to provide an off-set finger 20 which projects through the slots 18 and bears against the rear surface of the frame members 11 and 14. The body 21 of the bolt support 19 has an elongated slot 22 formed therethrough. Through this slot 22 projects the shank 23 of a mounting bolt 24. The body 21 has at its lower extremity a lateral lug 25 which is parallel to and of equal length with respect to the off-set of the finger 20. By such a construction when the license plate 16 is placed in confronting relation to the bolt support 19, the plate 16 will bear against the off-set finger 20 and the lug 25 will be held against a portion of the body of the plate 16 when a nut 26 is threaded onto the bolt 24 as seen in Fig. 4.

It should be noted that due to the presence of the slots 18 in the ears 17 of the frame members 11 and 14 and the slots 22 formed in the bolt supports 19, there is afforded a means for adjusting the position of the bolt 24 relative to the holes that are provided in the license plate 16, regardless of the size of the plate. The slots 18 will permit horizontal adjustment of the support to accommodate plates of varying lengths and the slots 22 of the bolt support 19 will permit vertical adjustment of the bolt 24 so as to accommodate plates of varying heights.

From the foregoing it is readily seen that my improved license plate holder provides a simple yet efficient method of attaching a license plate to such a holder regardless of the size of the license plate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A license plate holder comprising an integral frame of two elongated horizontal bars connected at their ends by vertical bars to form a rectangular frame having an opening adapted to disclose the body portion of a license plate, a lateral flange formed on the peripheral edge of said frame and cooperating with said horizontal and vertical bars to form a seat for said license plate, a plurality of spaced apart confronting ears carried by said horizontal bars and extending inwardly of said opening, said ears formed to provide slots extending parallel to said horizontal bars, means for connecting said license plate to said frame, a support for said connecting means comprising an off-set finger insertable in the slots of said ears and positionable between and in confronting relation with respect to a portion of said license plate and said horizontal bars, said support horizontally adjustable throughout the length of the slots of said ears to engage license plates of various lengths, and means provided by said support for permitting vertical adjustment of said connecting means relative to said support.

2. A license plate holder comprising an integral frame of two elongated horizontal bars connected at their ends by vertical bars to form a rectangular frame having an opening adapted to disclose the body portion of a license plate, a lateral flange formed on the peripheral edge of said frame and cooperating with said horizontal and vertical bars to form a seat for said license plate, a plurality of spaced apart confronting ears carried by said horizontal bars and extending inwardly of said opening, said ears formed to provide slots extending parallel to said horizontal bars, means for connecting said license plate to said frame, a support for said connecting means comprising an off-set finger insertable in the slots of said ears and positionable between and in confronting relation with respect to a portion of said license plate and said horizontal bars, said support horizontally adjustable throughout the length of the slots of said ears to engage license plates of various lengths, said support formed to provide elongated openings extending at right angles to the slots of said ears to permit vertical adjustment of said connecting means with respect to said support.

References Cited in the file of this patent

UNITED STATES PATENTS

| | | |
|---|---|---|
| D. 163,328 | Rothman | May 15, 1951 |
| D. 164,008 | Loyd | July 14, 1951 |
| 1,080,631 | Havemeyer | Dec. 9, 1913 |
| 1,505,608 | Seely | Aug. 19, 1924 |